United States Patent
Hattori

(10) Patent No.: US 8,434,596 B2
(45) Date of Patent: May 7, 2013

(54) LUBRICATION MONITORING DEVICE AND METHOD, AND ROLLING BEARING ASSEMBLY

(75) Inventor: Masashi Hattori, Nara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 949 days.

(21) Appl. No.: 12/314,367

(22) Filed: Dec. 9, 2008

(65) Prior Publication Data
US 2009/0152050 A1 Jun. 18, 2009

(30) Foreign Application Priority Data

Dec. 12, 2007 (JP) ................................. 2007-321141
Dec. 12, 2007 (JP) ................................. 2007-321183
Jun. 4, 2008 (JP) ................................. 2008-146886

(51) Int. Cl.
*F01M 1/18* (2006.01)
(52) U.S. Cl.
USPC ........................................................... 184/6.4
(58) Field of Classification Search ............ 184/6.4; 73/865.5
See application file for complete search history.

(56) References Cited

U.S. PATENT DOCUMENTS

| | | | | |
|---|---|---|---|---|
| 3,389,601 | A * | 6/1968 | Semplak | 73/170.17 |
| 7,134,323 | B1 * | 11/2006 | Discenzo | 73/53.05 |
| 7,439,072 | B2 * | 10/2008 | Shvets et al. | 436/150 |
| 2007/0071382 | A1 | 3/2007 | Suzuki | |

FOREIGN PATENT DOCUMENTS

| | | |
|---|---|---|
| DE | 101 62 055 A1 | 6/2003 |
| EP | 1 568 415 A2 | 8/2005 |
| EP | 1 770 295 A2 | 4/2007 |
| JP | 59-29495 | 2/1984 |
| JP | 3-165219 A | 7/1991 |
| JP | 6-241234 | 8/1994 |
| JP | 6-241234 A | 8/1994 |
| JP | 2005-112585 A | 4/2005 |
| JP | 2006-258263 | 9/2006 |
| JP | 2007-92886 | 4/2007 |

OTHER PUBLICATIONS

European Search Report dated Apr. 16, 2009.

* cited by examiner

*Primary Examiner* — Michael Mansen
*Assistant Examiner* — Robert T Reese
(74) *Attorney, Agent, or Firm* — McGinn IP Law Group, PLLC

(57) ABSTRACT

A lubrication monitoring device monitors a lubricating condition of a lubricator feeding an oil droplet at a predetermined time interval by means of a discharge nozzle having a nozzle orifice. The lubrication monitoring device comprises: a pair of electrodes disposed in the proximity of the nozzle orifice; a capacitance detecting portion for detecting the variation of capacitance between the pair of electrodes, the capacitance varying in conjunction with the varying amount of oil fed from the nozzle orifice to space between the pair of electrodes; and a determination portion for determining whether the oil droplet is fed at the predetermined time interval or not, the determination made based on the detection result supplied from the capacitance detecting portion.

12 Claims, 15 Drawing Sheets

LUBRICATION MONITORING DEVICE AND METHOD, AND ROLLING BEARING ASSEMBLY

BACKGROUND OF THE INVENTION

1. Field of the Invention

The present invention relates to a lubrication monitoring device and method as well as to a rolling bearing assembly.

2. Description of the Related Art

The rolling bearing assembly for supporting a rotary shaft or the like is lubricated by a proper method in order to prevent seizing. The known lubrication method may be exemplified by a seal system wherein grease or solid lubricant is sealed in space between inner and outer rings of the rolling bearing assembly for lubrication, an oil bath system wherein the rolling bearing is operated as dipped in a lubricant, or the like. Unfortunately, these methods require a large quantity of lubricant which results in substantial lubricant waste.

On the other hand, there are also known a method wherein the lubricant is injected to a lubrication point by operating a pump, and a method which employs an oil-air lubrication system for feeding oil little by little. These methods have advantages of being capable of feeding the oil on an as-needed basis and wasting less lubricant. More recently, a so-called nanolubrication has been adopted wherein a rolling bearing is lubricated with oil droplets at a rate ranging from several nl/min to several hundred nl/min.

Japanese Unexamined Patent Publication No. 2007-92886 discloses a rolling bearing assembly which employs a micro pump for feeding the lubricant to space between the inner ring and the outer ring of the rolling bearing. The micro pump is adapted to draw the lubricant from a tank by means of a diaphragm pulsated by a piezoelectric device and to discharge a microscopic droplet of lubricant from a discharge nozzle at a predetermined time interval.

In the so-called nanolubrication, however, an absolutely small amount of lubricant is supplied as described above. Hence, the nanolubrication is prone to entail poor lubrication unless the lubricant continues to be fed at the predetermined time intervals. It is therefore crucial to monitor the condition of feeding the oil droplet and to determine whether the lubricant is fed properly or not.

SUMMARY OF THE INVENTION

The invention seeks to provide a lubrication monitoring device and a method therefor which are adapted to monitor a lubricating condition of a lubricator feeding an oil droplet at a predetermined time interval and to make a correct determination on whether the oil is fed properly or not, as well as to provide a rolling bearing assembly equipped with such lubricator and lubrication monitoring device.

In accordance with the invention, a lubrication monitoring device operates to monitor a lubricating condition of a lubricator feeding an oil droplet at a predetermined time interval by means of a discharge nozzle having a nozzle orifice and comprises:

a pair of electrodes disposed in the proximity of the nozzle orifice;

a capacitance detecting portion for detecting the variation of capacitance between the pair of electrodes, the capacitance varying in conjunction with the varying amount of oil discharged from the nozzle orifice in space between the pair of electrodes; and a determination portion for determining whether the oil droplet is fed at the predetermined time interval or not, the determination made based on the detection result supplied from the capacitance detecting portion.

The above lubrication monitoring device may also have a constitution wherein the pair of electrodes face each other across the nozzle orifice.

In the lubricator of the type wherein the oil droplet is fed from the nozzle orifice of the discharge nozzle at the predetermined time interval, an operation cycle in which the surface tension of the oil allows the oil droplet around the nozzle orifice to grow gradually till the oil droplet grown to a predetermined size falls by gravity is repeated at the predetermined time interval.

Particularly in the case where the pair of electrodes face each other across the nozzle orifice, the surface tension of the oil allows the oil discharged from the nozzle orifice of the discharge nozzle to be temporarily retained between the pair of electrodes. The retained oil is further increased in volume over time so as to bulge from space between the pair of electrodes in an oil discharge direction. When the surface tension of the oil reaches its limit, some of the retained oil falls as an oil droplet. The varied amount of oil between the pair of electrodes involves the variation of capacitance between the pair of electrodes. The invention is constituted to detect such a variation of capacitance between the pair of electrodes so that whether or not the oil droplet is fed properly from the discharge nozzle at the predetermined time interval can be determined based on the capacitance variation.

The above lubrication monitoring device may also have a constitution wherein one of the paired electrodes is the discharge nozzle, and wherein the other electrode is disposed at a predetermined distance from the nozzle orifice of the discharge nozzle. In this case, the capacitance detecting portion detects the variation of capacitance between the discharge nozzle and the other electrode, the capacitance varying in conjunction with the growth of the oil droplet around the nozzle orifice.

According to this constitution, the capacitance between the discharge nozzle constituting the one electrode and the other electrode spaced the predetermined distance from the discharge nozzle varies in conjunction with the growth of the oil droplet around the nozzle orifice. The capacitance detecting portion detects such a variation of the capacitance between the discharge nozzle and the other electrode so that the determination can be made based on the variation of capacitance as to whether or not the oil droplet is properly fed from the discharge nozzle at the predetermined time interval.

The above lubrication monitoring device may also have a constitution wherein one of the paired electrodes is the discharge nozzle, wherein the other electrode is disposed at place lateral to the discharge nozzle and adjacent to the nozzle orifice as spaced a predetermined distance therefrom, and wherein an oil droplet receiving portion facing the other electrode across the oil droplet is provided on a circumference of the nozzle orifice in order to inhibit the oil droplet discharged from the nozzle orifice from bulging to a side opposite from the other electrode. In this case, as well, the capacitance detecting portion detects the variation of the capacitance between the discharge nozzle and the other electrode, the capacitance varying in conjunction with the growth of the oil droplet around the nozzle orifice.

According to this constitution, the capacitance between the discharge nozzle constituting the one electrode and the other electrode disposed at place lateral to the discharge nozzle and adjacent to the nozzle orifice as spaced the predetermined distance therefrom varies in conjunction with the growth of the oil droplet around the nozzle orifice. The capacitance detecting portion detects such a variation of the capacitance between the discharge nozzle and the other electrode so that the determination can be made based on the variation of capacitance as to whether or not the oil droplet is properly fed from the discharge nozzle at the predetermined time interval. Furthermore, the oil droplet receiving portion inhibits the oil droplet from bulging to the side opposite from the other electrode so that the oil droplet discharged from the nozzle orifice is positively allowed to grow toward the other electrode. Thus, the capacitance variation associated with the growth of the oil droplet can be increased. Accordingly, the capacitance detecting portion can achieve increased detection sensitivity.

In accordance with the invention, a lubrication monitoring method for monitoring a lubricating condition of a lubricator feeding an oil droplet at a predetermined time interval by means of a discharge nozzle having a nozzle orifice is characterized in that a pair of electrodes are disposed in the proximity of the nozzle orifice, that the lubrication monitoring method includes the step of: detecting the variation of capacitance between the pair of electrodes, the capacitance varying in conjunction with the varying amount of oil discharged from the nozzle orifice in space between the pair of electrodes; and determining whether the oil droplet is fed at the predetermined time interval or not based on the detection result.

The above lubrication monitoring method may also have a constitution wherein the pair of electrodes face each other across the nozzle orifice.

The above lubrication monitoring method may also have a constitution wherein one of the paired electrodes is the discharge nozzle, and wherein the other electrode is disposed at a predetermined distance from the nozzle orifice of the discharge nozzle.

In this case, the detecting step of the lubrication monitoring method is to detect the variation of capacitance between the discharge nozzle and the other electrode, the capacitance varying in conjunction with the growth of the oil droplet around the nozzle orifice.

The above lubrication monitoring method may also have a constitution wherein one of the paired electrodes is the discharge nozzle, and wherein the other electrode is disposed at place lateral to the discharge nozzle and spaced a predetermined distance from the nozzle orifice. In this case, an oil droplet receiving portion facing the other electrode across the oil droplet may be provided on a circumference of the nozzle orifice in order to inhibit the oil droplet discharged from the nozzle orifice from bulging to a side opposite from the electrode. And the detecting step of the lubrication monitoring method is to detect the variation of capacitance between the discharge nozzle and the other electrode, the capacitance varying in conjunction with the growth of the oil droplet around the nozzle orifice.

In accordance with the invention, a rolling bearing assembly comprises: a rolling bearing including a first race, a second race and a rolling element interposed between the first and second races;

a lubricator including a discharge nozzle having a nozzle orifice and operating to output an oil droplet from the nozzle orifice at a predetermined time interval for feeding the oil to space between the first and second races;

a pair of electrodes disposed in the proximity of the nozzle orifice;

a capacitance detecting portion for detecting the variation of capacitance between the pair of electrodes, the capacitance varying in conjunction with the varying amount of oil discharged from the nozzle orifice in space between the pair of electrodes; and a determination portion for determining whether the oil droplet is fed at the predetermined time interval or not, the determination made based on the detection result supplied from the capacitance detecting portion.

The above rolling bearing assembly may also have a constitution wherein the pair of electrodes face each other across the nozzle orifice of the discharge nozzle.

The above rolling bearing assembly may also have a constitution wherein one of the paired electrodes is the discharge nozzle, and wherein the other electrode is disposed at a predetermined distance from the nozzle orifice of the discharge nozzle. In this case, the capacitance detecting portion detects the variation of capacitance between the discharge nozzle and the other electrode, the capacitance varying in conjunction with the growth of the oil droplet around the nozzle orifice.

The above rolling bearing assembly may also have a constitution wherein one of the paired electrodes is the discharge nozzle, wherein the other electrode is disposed at place lateral to the discharge nozzle and adjacent to the nozzle orifice as spaced a predetermined distance therefrom, and wherein an oil droplet receiving portion facing the other electrode across the oil droplet is provided on a circumference of the nozzle orifice in order to inhibit the oil droplet discharged from the nozzle orifice from bulging to a side opposite from the other electrode. In this case, the capacitance detecting portion detects the variation of capacitance between the discharge nozzle and the other electrode, the capacitance varying in conjunction with the growth of the oil droplet around the nozzle orifice.

BRIEF DESCRIPTION OF THE DRAWINGS

FIG. 5b is a sectional view taken on the line A-A in FIG. 5a;

FIG. 10b is a sectional view taken on the line B-B in FIG. 10a;

FIG. 14b is a sectional view taken on the line C-C in FIG. 14a; and

DETAILED DESCRIPTION OF THE PREFERRED EMBODIMENTS

Figure 1:
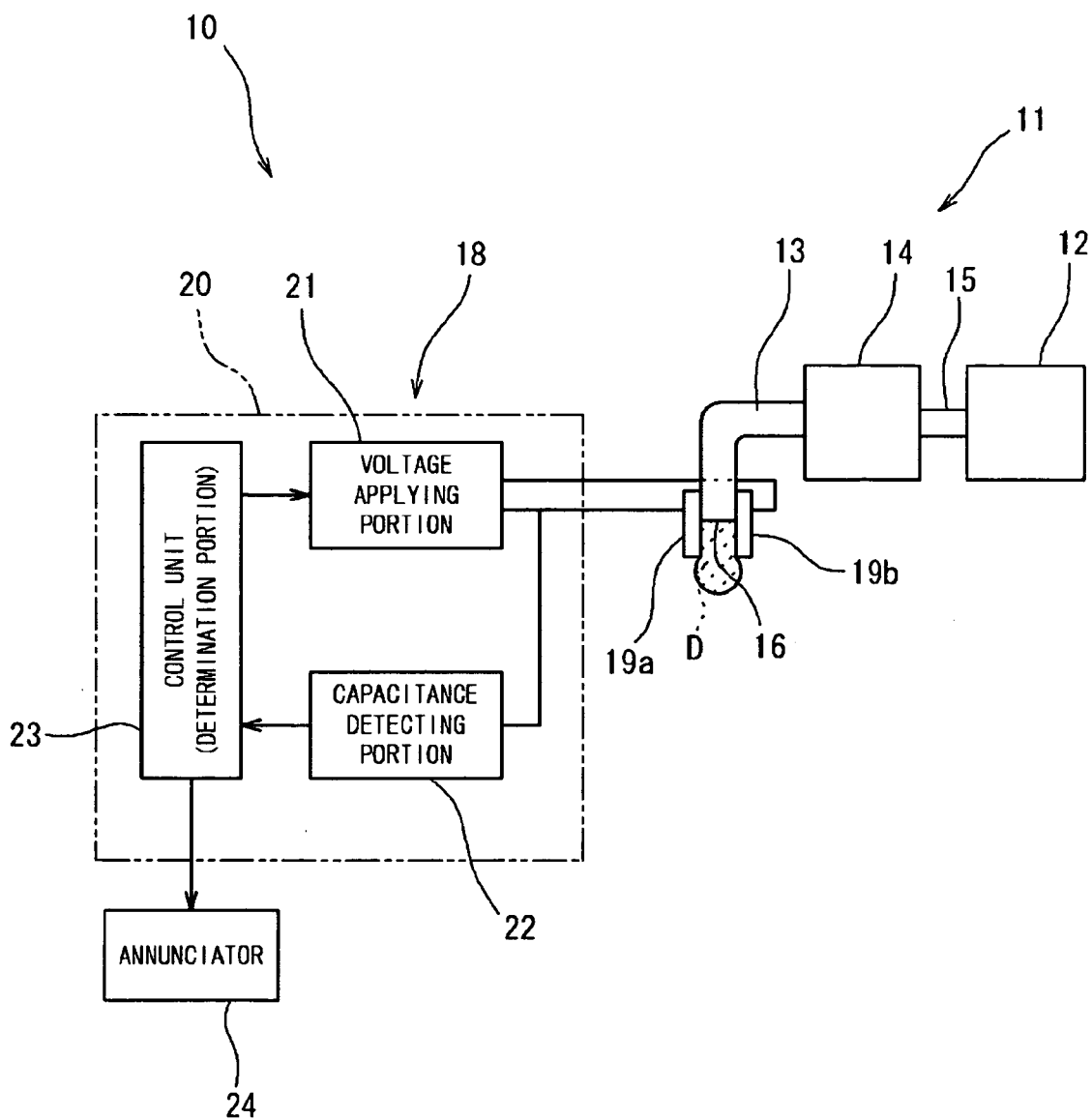
FIG. 1 is a schematic diagram showing a lubrication monitoring device and a lubricator according to a first embodiment of the invention.

FIG. 1 is a schematic diagram showing a lubrication monitoring device 10 and a lubricator 11 according to a first embodiment of the invention. The lubrication monitoring device 10 monitors a lubricating condition of the lubricator 11 which discharges an oil droplet from a discharge nozzle 13. Firstly, the lubricator 11 is described.

The lubricator 11 includes: a tank 12 for storing oil such as lubricant; a micro pump 14 for drawing the oil from the tank 12 and discharging the oil from the discharge nozzle 13; and a lubrication channel 15 interconnecting the tank 12 and the micro pump 14.

The micro pump 14 may be exemplified by a diaphragm pump conventionally known in the art. The diaphragm pump is arranged such that a piezoelectric device is used for pulsating a diaphragm thereby drawing the oil from the tank 12 and discharging the oil from the discharge nozzle 13. In order to implement a so-called nanolubrication to feed the oil to a lubrication point at a rate ranging from several nl/min to several hundred nl/min (nanoliter per minute), for example, the micro pump 14 is designed to operate the piezoelectric device at an interval of a few seconds thereby drawing a trace amount of oil from the tank 12 each time and to feed the oil droplet D from the discharge nozzle 13 to the lubrication point at an interval of a few seconds to tens of minutes.

The discharge nozzle 13 of the micro pump 14 is designed to have an outside diameter of about 0.8 mm and an inside diameter of about 0.5 mm, for example. In the form illustrated, the discharge nozzle 13 is bent in an L-shape such that a distal end thereof is vertically directed. The discharge nozzle 13 has a nozzle orifice 16 opened downward.

Next, description is made on the lubrication monitoring device 10. As shown in FIG. 1, the lubrication monitoring device 10 is equipped with a capacitance type sensor 18 which includes a pair of electrodes 19a, 19b, and a measurement section 20. The pair of electrodes 19a, 19b are projected downward (an oil discharging direction) from the nozzle orifice 16 of the discharge nozzle 13.

Figure 2:
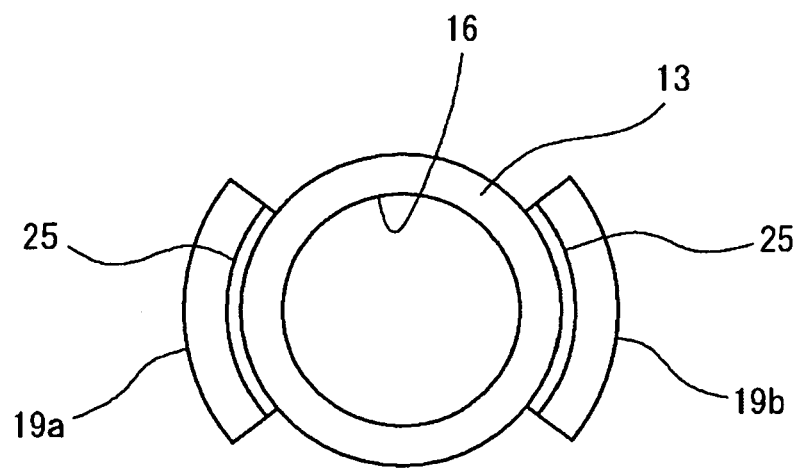
FIG. 2 is a diagram of a discharge nozzle of the lubricator shown in FIG. 1, as seen from a distal end thereof.

Specifically, the pair of electrodes 19a, 19b are mounted to the distal end of the discharge nozzle 13 on an outside surface of a peripheral wall thereof in a manner to face each other across the nozzle orifice 16, as shown in FIG. 2. In a case where the discharge nozzle 13 is formed of a conductive material such as a metal, an electrically insulating material 25 is interposed between the discharge nozzle 13 and the pair of electrodes 19a, 19b. The capacitance type sensor 18 is designed to detect a capacitance between the pair of electrodes 19a, 19b by means of the measurement section 20.

As shown in FIG. 1, the measurement section 20 includes a voltage applying portion 21, a capacitance detecting portion 22, a control unit 23 and the like. The voltage applying portion 21 applies an alternating voltage to the pair of electrodes 19a, 19b while a capacitance between the pair of electrodes 19a, 19b is detected by the capacitance detecting portion 22. The capacitance detecting portion 22 inputs a detection result to the control unit 23, which controls an annunciator 24 and the like based on the detection result. In the event of abnormality detected by the capacitance detecting portion 22, the annunciator 24 informs an operator of the abnormality by way of sound, light or the like.

The capacitance detecting portion 22 is designed to indirectly detect the capacitance by taking measurement on an output voltage from the voltage applying portion 21 or on a current through the pair of electrodes 19a, 19b. With the decrease of the capacitance between the pair of electrodes 19a, 19b, impedance between the electrodes increases so that the current flowing through the pair of electrodes 19a, 19b is decreased. Therefore, in a case where the control unit 23 controls the output voltage from the voltage applying portion 21 so as to provide a constant current flow through the pair of electrodes 19a, 19b, for example, the capacitance between the pair of electrodes 19a, 19b can be indirectly detected by taking measurement on the output voltage. In a case where the voltage applying portion 21 applies a constant voltage between the pair of electrodes 19a, 19b, the capacitance can be indirectly detected by taking measurement on the current flowing through the pair of electrodes 19a, 19b.

Figure 3A:
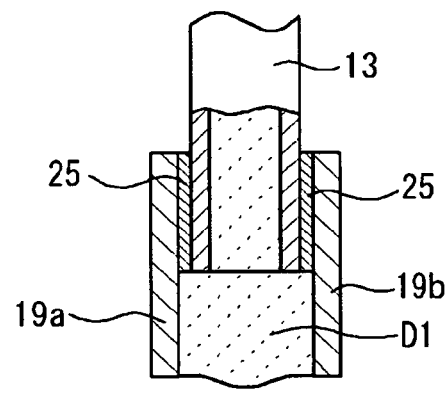
FIG. 3a to FIG. 3d are diagrams illustrating the change in state of oil discharged from the discharge nozzle of the lubricator shown in FIG. 1.
Figure 3B:
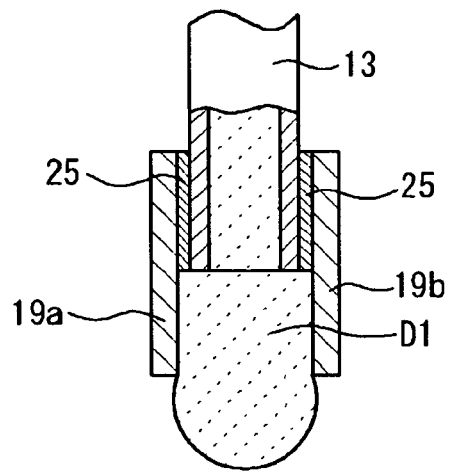
Figure 3C:
Figure 3C:
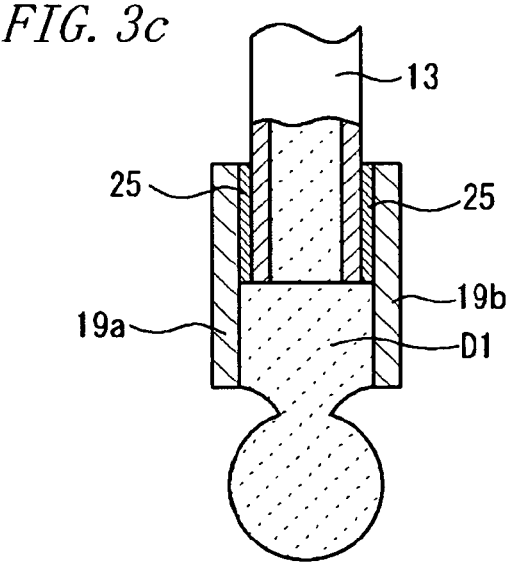
Figure 3D:
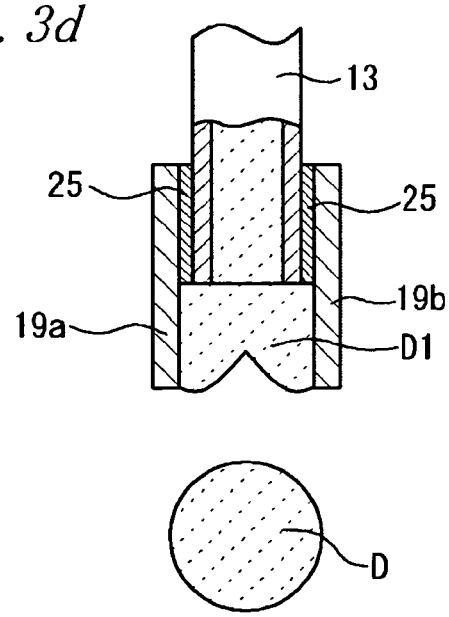

FIG. 3a to FIG. 3d are diagrams illustrating the change in state of the oil discharged from the discharge nozzle 13 when the micro pump 14 is operated. The oil droplet D undergoes a process including the steps shown in FIG. 3a to FIG. 3d so as to be outputted from the discharge nozzle 13. As shown in FIG. 3a, an oil drop D1 discharged from the discharge nozzle 13 is retained between the pair of electrodes 19a, 19b due to the surface tension of the oil. Subsequently, as shown in FIG. 3b, the oil drop D1 retained between the pair of electrodes 19a, 19b is gradually increased in volume so as to bulge downward from distal ends of the electrodes 19a, 19b. When the surface tension of the oil drop D1 reaches its limit as shown in FIG. 3c, a lower end portion of the oil drop D1 forms a spherical shape, tending to be outputted from the pair of electrodes 19a, 19b. Finally, as shown in FIG. 3d, the oil drop D1 falls from the discharge nozzle 13 as forming the spherical oil droplet D. When the oil droplet D falls, the oil drop D1 retained between the pair of electrodes 19a, 19b is decreased in volume. The lubricator 11 repeats these steps shown in FIG. 3a to FIG. 3d in a predetermined cycle, thereby feeding an oil droplet to the lubrication point at a predetermined time interval.

Figure 4:
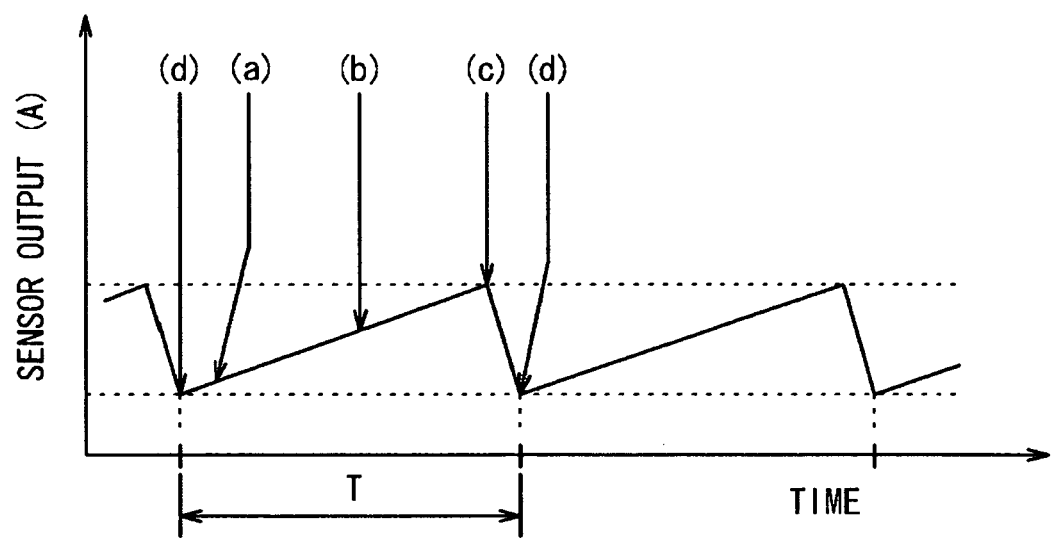
FIG. 4 is a graph schematically showing the moment-to-moment change of output value (sensor output) of a capacitance detecting portion of the lubricator shown in FIG. 1.

As the oil drop D1 between the pair of electrodes 19a, 19b is gradually increased in volume during the lubrication performed by the lubricator 11, dielectric constant between the pair of electrodes 19a, 19b is varied. Accordingly, the capacitance between the pair of electrodes 19a, 19b is also varied. FIG. 4 is a graph schematically showing the moment-to-moment change of output value (sensor output) of the capacitance detecting portion 22. In this graph, the output value from the capacitance detecting portion 22 represents the value of current flowing through the pair of electrodes 19a, 19b. With the increase of the sensor output, the capacitance between the pair of electrodes 19a, 19b is increased. With the decrease of the sensor output, the capacitance is decreased. Namely, the sensor output and the capacitance are substantially in a proportional relation.

Symbols 'a' to 'd' in FIG. 4 correspond to the respective states of the discharged oil shown in FIG. 3a to FIG. 3d. Immediately after the oil droplet D is outputted from the discharge nozzle 13, as shown in FIG. 3d, the oil drop D1 retained between the pair of electrodes 19a, 19b is decreased in volume and hence, the sensor output is decreased to the minimum as indicated by the symbol 'd' in FIG. 4. Namely, the capacitance between the pair of electrodes 19a, 19b is minimized.

As the oil drop D1 between the pair of electrodes 19a, 19b is gradually increased in volume as shown in FIG. 3a and FIG. 3b, the sensor output is gradually increased as indicated by the symbols 'a' and 'b' in FIG. 4. Just before the fall of the oil droplet as shown in FIG. 3c, the sensor output is peaked as indicated by the symbol 'c' in FIG. 4. Subsequently when the oil droplet D falls by gravity as shown in FIG. 3d, the oil drop D1 between the pair of electrodes 19a, 19b is decreased in volume again. As indicated by the symbol 'd' in FIG. 4, therefore, the sensor output is decreased sharply (the capacitance is decreases sharply), returned to the minimum value.

Therefore, the sensor output varies in a cycle in which the oil drop D1 retained between the pair of electrodes 19a, 19b is gradually increased in volume so as to allow the oil droplet D to fall off (see the cycle T in FIG. 4). The sensor output varies sharply during a time period from the peaked volume of the oil drop D1 to the fall of the oil droplet (period between the symbols 'c' and 'd' in FIG. 4). Hence, the output of the oil droplet D from the discharge nozzle 13 can be detected by picking up this variation.

The control unit 23 of the measurement section 20 determines the lubricator 11 to be in normal operation if the sensor output varies in the cycle T as shown in FIG. 4. In a case where the sensor output does not vary in the predetermined cycle despite the operation of the micro pump 14, such as where the sensor output does not decrease sharply as indicated by the symbols 'c' and 'd' of FIG. 4 or where the sharp decrease of the sensor output appears earlier or later than the predetermined point of time, the control unit determines that the oil droplet D is not supplied properly. The control unit 23 functions as a determination portion which makes determination, based on the capacitance variation, as to whether the lubrication is provided properly or not.

When determining that the lubrication is not provided properly, the control unit 23 issues a predetermined annunciation signal by controlling the annunciator 24, for example, thereby informing the operator of the abnormal lubrication. Therefore, the operator can quickly recognize the occurrence of the abnormal lubrication. The operator may take action such as to shut down the operation of a portion to be lubricated thereby obviating a trouble caused by the poor lubrication. When determining that the lubrication is not provided properly, the control unit 23 may also provide a control such as to directly shut down the operation of the portion to be lubricated or to operate the micro pump 14 for feeding a proper amount of oil.

According to the embodiment, the variation of capacitance associated with the oil retained between the pair of electrodes 19a, 19b is detected and hence, the detection is not affected by the behavior or configuration of the oil droplet D thus outputted. This provides for a more correct monitoring of the lubricating condition than a case where the condition of the outputted oil droplet D is detected.

Figure 5A:
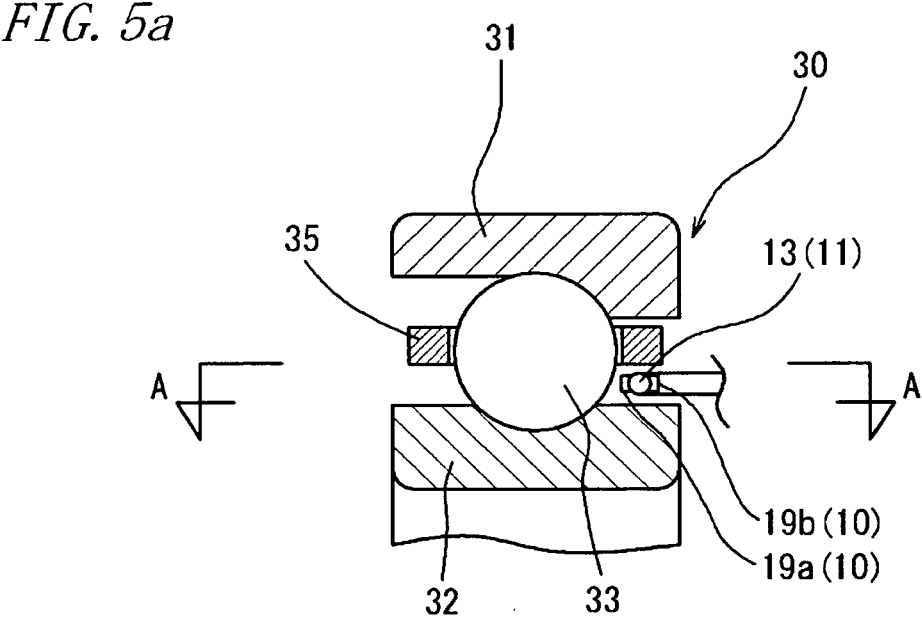
FIG. 5a is a sectional view showing a rolling bearing assembly equipped with the lubricator and lubrication monitoring device.
Figure 5B:
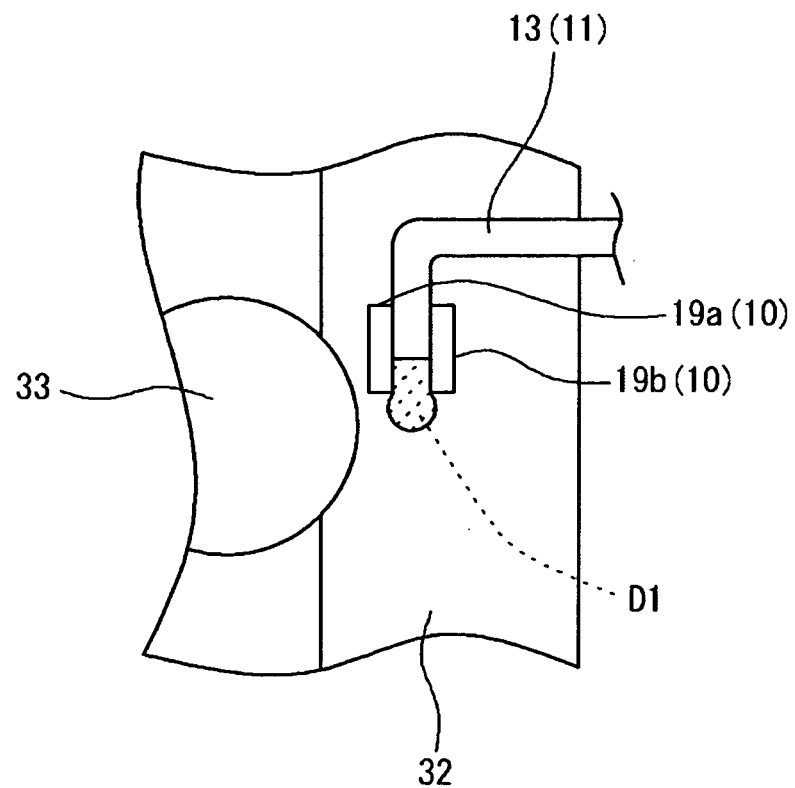

The above-described lubricator 11 and lubrication monitoring device 10 may be used for lubricating a rolling bearing. FIG. 5a is a sectional view showing a rolling bearing assembly equipped with the lubricator 11 and lubrication monitoring device 10. FIG. 5b is a sectional view taken on the line A-A in FIG. 5a. The discharge nozzle 13 of the lubricator 11 is disposed in space defined between an outer ring (a first race) 31 and an inner ring (a second race) 32 of a rolling bearing 30. More specifically, the distal end of the discharge nozzle 13 is disposed in space which is defined radially outwardly of the inner ring 32 of the rolling bearing 30 and radially inwardly of a cage 35 and at which the inner ring 32 overlaps with the cage 35 in the radial direction. The discharge nozzle 13 is disposed in non-contact relation to the inner ring 32 and the cage 35. The pair of electrodes 19a, 19b in spaced relation are attached to the distal end of the discharge nozzle 13.

Thus, the raceway surfaces of the inner ring 32 and the outer ring 31 and a rolling surface of a ball (a rolling element) 33 disposed therebetween can be lubricated with the oil droplet D supplied from the discharge nozzle 13. In the meantime, the lubricating condition can be monitored by means of the lubrication monitoring device 10. While the distal end of the discharge nozzle 13 may be oriented in the vertical direction as shown in FIG. 1, the distal end thereof may also be oriented in a horizontal direction as shown in FIG. 5a and FIG. 5b or in any other direction according to the layout of the rolling bearing 30.

Figure 6:
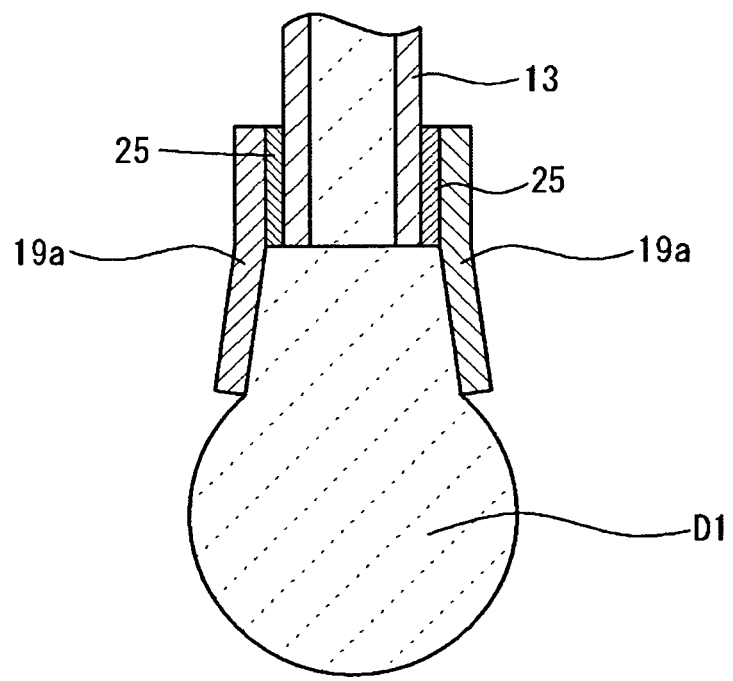
FIG. 6 is a sectional view showing an exemplary modification of an electrode of the lubrication monitoring device.

FIG. 6 is a sectional view showing an exemplary modification of the paired electrodes 19a, 19b of the capacitance type sensor 18 of the lubrication monitoring device 10. This modification is constituted such that the distance between the paired electrodes 19a, 19b is progressively increased toward the distal ends thereof. This permits the paired electrodes 19a, 19b to retain a greater amount of oil drop D1 therebetween so that the capacitance variation can be detected more easily.

Figure 7:
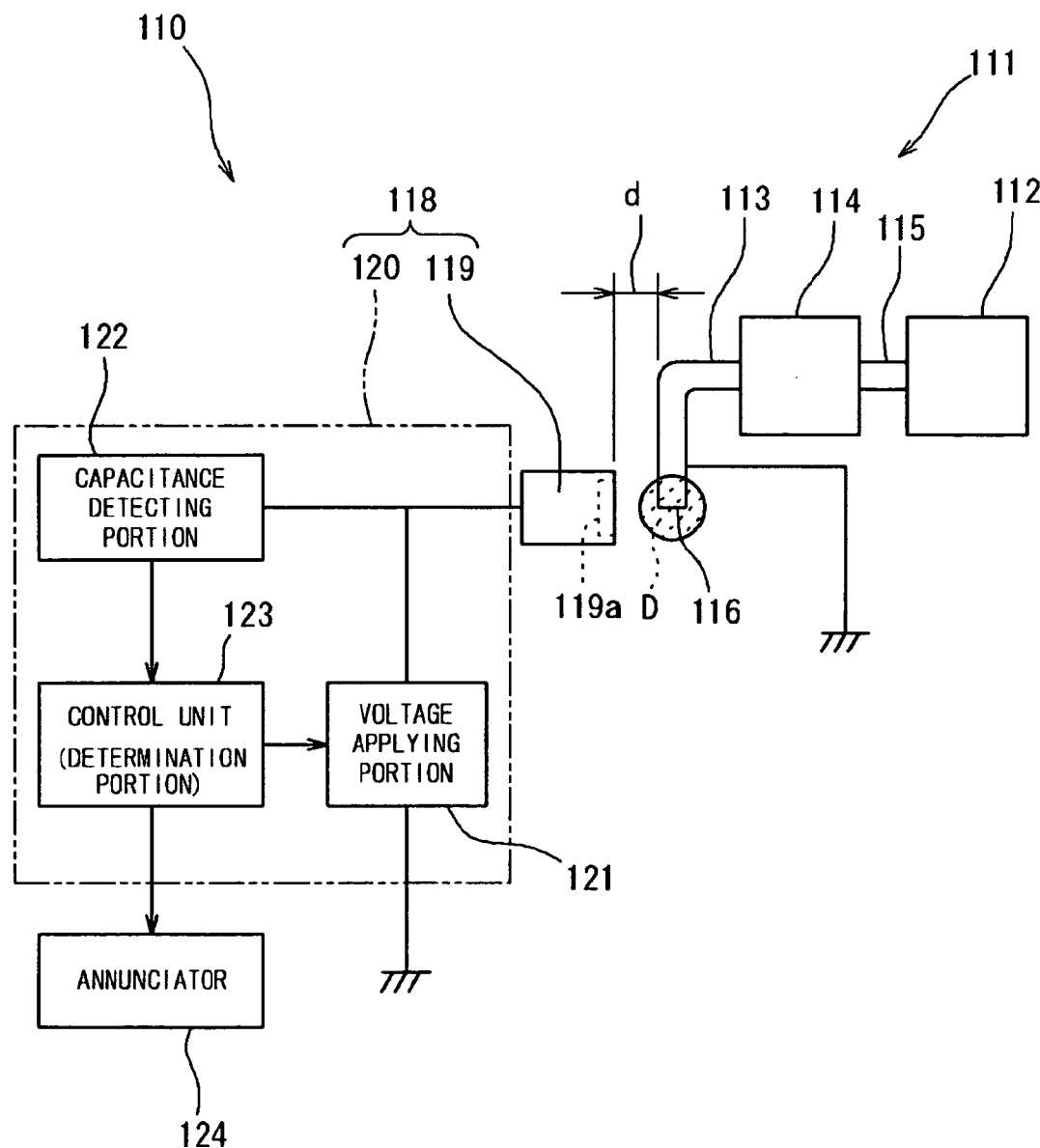
FIG. 7 is a schematic diagram showing a lubrication monitoring device and a lubricator according to a second embodiment of the invention.

FIG. 7 is a schematic diagram showing a lubrication monitoring device and a lubricator according to a second embodiment of the invention. The lubricator 111 of the embodiment includes a tank 112, a micro pump 114 and a lubrication channel 115. The lubricator 111 is constructed the same way as the lubricator 11 of the first embodiment except that a discharge nozzle 113 of the micro pump 114 is not provided with a pair of electrodes at a distal end thereof. Therefore, a detailed description on parts corresponding to those of the first embodiment is dispensed with.

Figure 8A:
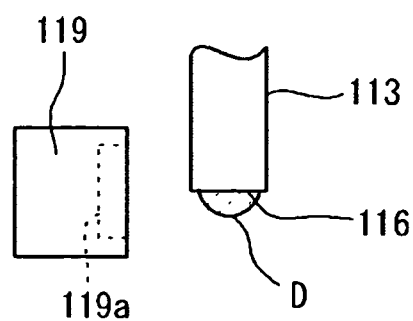
FIG. 8a to FIG. 8d are diagrams illustrating the change in state of oil discharged from a discharge nozzle of the lubricator shown in FIG. 7.
Figure 8B:
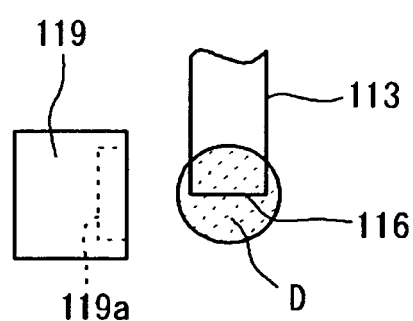
Figure 8C:
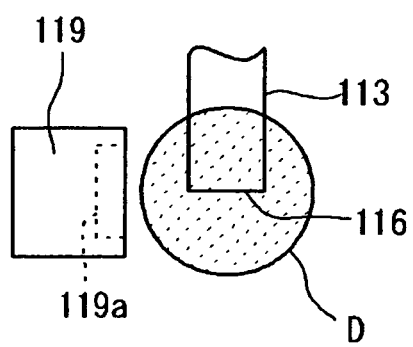
Figure 8D:
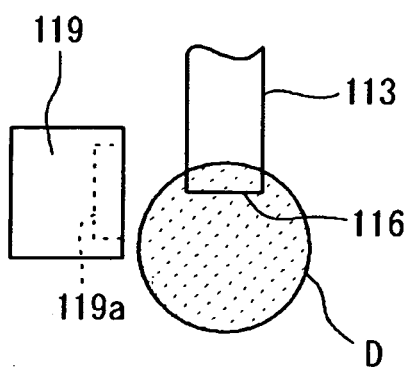

Now description is made on how the oil is discharged from the discharge nozzle 113 when the micro pump 114 of the lubricator 111 of the embodiment is operated. FIG. 8a to FIG. 8d are diagrams illustrating the change in state of the oil discharged from the discharge nozzle 113. The oil droplet D undergoes a process including the steps shown in FIG. 8a to FIG. 8d so as to be outputted from the discharge nozzle 113. FIG. 8a shows a state immediately after the oil droplet D is outputted from the discharge nozzle 113. In this state, a trace amount of oil to be discharged is bulged from a nozzle orifice 116 of the discharge nozzle 113. Subsequently, as shown in FIG. 8b, the surface tension allows the oil droplet D to form a spherical shape encompassing the nozzle orifice 116. The oil droplet is gradually increased in volume. FIG. 8c shows a state where the oil droplet D has grown to the maximum size. FIG. 8d shows a state where the oil droplet D grown to the maximum size is slid down by gravity along the discharge nozzle 113. This state is immediately followed by the fall of the oil droplet D from the discharge nozzle 113. The lubricator 111 repeats the steps shown in FIG. 8a to FIG. 8d in a predetermined cycle, thereby to feed an oil droplet to the lubrication point at a predetermined time interval. In a case where the discharge nozzle 113 having an inside diameter of 0.5 mm is used as suggested by the embodiment, the oil droplet D can grow to a size of about 2 mm in diameter depending upon conditions such as ambient wind pressure and vibrations.

Next, a lubrication monitoring device 110 is described. As shown in FIG. 7, the lubrication monitoring device 110 includes a capacitance type sensor 118. The capacitance type sensor 118 includes a sensor head 119 and a measurement section 120. The sensor head 119 is provided with an electrode 119a at a distal end thereof. The capacitance type sensor 118 is designed to detect a capacitance between the electrode 119a of the sensor head 119 and a measurement object by means of the measurement section 120.

The capacitance type sensor 118 of the embodiment regards the discharge nozzle 113 of the lubricator 111 as the measurement object and detects the capacitance between the discharge nozzle 113 and the sensor head 119. Therefore, the discharge nozzle 113 per se also functions as the electrode. That is, the electrode 119a of the sensor head 119 and the discharge nozzle 113 constitute a pair of electrodes.

The electrode 119a of the sensor head 119 is spaced a given distance 'd' from the discharge nozzle 113. According to the embodiment, the electrode 119a is laterally disposed from the nozzle orifice 116 of the discharge nozzle 113 at a distance 'd' of about 1.5 mm. The distance 'd' is so defined as not to allow the oil droplet D grown to the maximum size to make contact with the sensor head 119 and as to ensure a sufficient detection sensitivity of the capacitance type sensor 118. The discharge nozzle 113 is formed of a conductive material (a metal such as SUS) and is connected to a common potential (ground potential) to a GND line of the capacitance type sensor 118.

Similarly to the first embodiment, the measurement section 120 includes a voltage applying portion 121, a capacitance detecting portion 122, a control unit 123 and the like. The voltage applying portion 121 applies an alternating voltage to the sensor head 119, while a capacitance between the sensor head 119 and the discharge nozzle 113 is detected by the capacitance detecting portion 122. The capacitance detecting portion 122 inputs a detection result to the control unit 123, which controls an annunciator 124 and the like based on the detection result. In the event of abnormality detected by the capacitance detecting portion 122, the annunciator 124 informs the operator of the abnormality by way of sound, light or the like.

Similarly to the first embodiment, the capacitance detecting portion 122 is designed to indirectly detect the capacitance by taking measurement on the output voltage from the voltage applying portion 121 or on the current flowing through the sensor head 119. With the decrease of the capacitance between the sensor head 119 and the discharge nozzle 113, the impedance therebetween increases so that the current flowing through the sensor head 119 is decreased. Therefore, in a case where the control unit 123 controls the output voltage from the voltage applying portion 121 so as to provide a constant current flow through the sensor head 119, for example, the capacitance between the sensor head 119 and the discharge nozzle 113 can be indirectly detected by taking measurement on the output voltage. In a case where the voltage applying portion 121 applies a constant voltage, the capacitance can be indirectly detected by taking measurement on the current flowing through the sensor head 119.

Since the distance 'd' between the sensor head 119 and the discharge nozzle 113 is constant, the capacitance therebetween does not vary unless the oil droplet D is discharged from the discharge nozzle 113. However, as shown in FIG. 8, the oil droplet D adherent to the discharge nozzle 113 gradually grows in size in the course of lubrication performed by the lubricator 111. During the growth of the oil droplet, therefore, the oil is present between the sensor head 119 and the discharge nozzle 113 so that the dielectric constant between the sensor head 119 and the discharge nozzle 113 is varied. Thus, the capacitance between the sensor head 119 and the discharge nozzle 113 varies in conjunction with the growth of the oil droplet D at the discharge nozzle 113.

Figure 9:
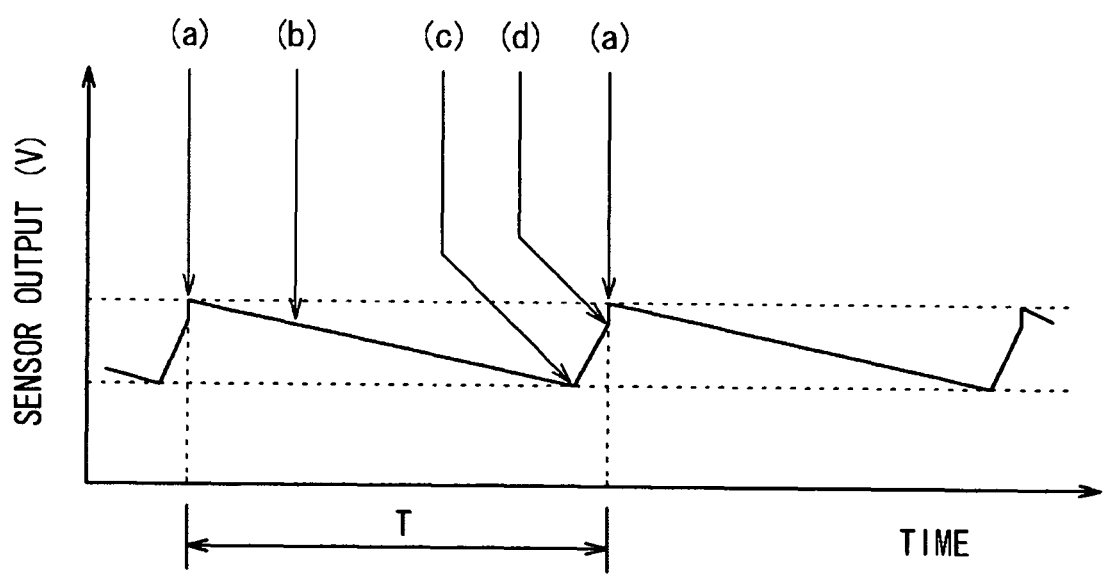
FIG. 9 is a graph schematically showing the moment-to-moment change of output value (sensor output) of a capacitance detecting portion of the lubricator shown in FIG. 7.

FIG. 9 is a graph schematically showing the moment-to-moment change of output value (sensor output) of the capacitance detecting portion 122. In this graph, the output value from the capacitance detecting portion 122 represents the output voltage (V) from the voltage applying portion 121. The output voltage is generally in inverse proportion to the capacitance. As the sensor output increases, therefore, the capacitance between the sensor head 119 and the discharge nozzle 113 is decreased. With the decrease of the sensor output, the capacitance is increased.

Symbols 'a' to 'd' in FIG. 9 correspond to the respective degrees of growth of the oil droplet D shown in FIG. 8a to FIG. 8d. In a state where the oil droplet has been just outputted from the discharge nozzle 113 and the subsequent oil droplet D has grown little, as shown in FIG. 8a, the sensor output is peaked as indicated by the symbol 'a' of FIG. 9. In other words, very little oil is present between the sensor head 119 and the discharge nozzle 113 so that the capacitance therebetween is minimized.

As the oil droplet D around the nozzle orifice of the discharge nozzle 113 gradually grows as shown in FIG. 8b, the sensor output is gradually decreased as indicated by the symbol 'b' of FIG. 9. Namely, the capacitance between the sensor head 119 and the discharge nozzle 113 is gradually increased. When the oil droplet D is grown to the maximum size as shown in FIG. 8c, the sensor output is decreased to the minimum (the capacitance increased to the maximum) as indicated by the symbol 'c' of FIG. 9. Subsequently when the oil droplet D is slid down by gravity as shown in FIG. 8d, the sensor output rises sharply (the capacitance drops sharply) as indicated by the symbol 'd' of FIG. 9 because the oil droplet D present between the sensor head 119 and the discharge nozzle 113 is decreased in volume. Shortly thereafter, the oil droplet D falls and the sensor output is returned to the maximum value.

Accordingly, the sensor output varies in a cycle in which the oil droplet D at the discharge nozzle 113 gradually grows to a size to be outputted (see the cycle T in FIG. 9). The sensor output varies sharply during a time period from the maximum size of the oil droplet D to the fall thereof (a period between the symbols 'c' to 'a' in FIG. 9). Hence, the output of the oil droplet D from the discharge nozzle 113 can be detected by picking up this variation.

The control unit 123 of the measurement section 120 determines the lubricator 111 to be in normal operation if the sensor output varies in the cycle T shown in FIG. 9. In a case where the sensor output does not vary in the predetermined cycle despite the operation of the micro pump 114, such as where the sensor output does not increase sharply as indicated by the symbols 'c' to 'a' of FIG. 9 or where the sharp increase of the sensor output appears earlier or later than the predetermined point of time, the control unit determines that the oil droplet D is not discharged properly. The control unit 123 functions as a determination portion which makes determination, based on the capacitance variation, as to whether the lubrication is provided properly or not. When determining that the lubrication is not provided properly, the control unit 123 issues a predetermined annunciation signal by controlling the annunciator 124, for example, thereby informing the operator of the abnormal lubrication.

Therefore, the operator can quickly recognize the occurrence of the abnormal lubrication. The operator may take action such as to shut down the operation of a portion to be lubricated thereby obviating a trouble caused by the poor lubrication. When determining that the lubrication is not provided properly, the control unit 123 may also provide a control such as to shut down the operation of the portion to be lubricated or to operate the micro pump 114 for feeding a proper amount of oil.

According to the embodiment, the capacitance variation associated with the oil droplet D to be outputted from the discharge nozzle 113 (the oil droplet D before falling from the discharge nozzle 113) is detected and hence, the detection is not affected by the behavior or configuration of the oil droplet D thus outputted. This provides for a more correct monitoring of the lubricating condition than the case where the condition of the outputted oil droplet D is detected.

Figure 10A:
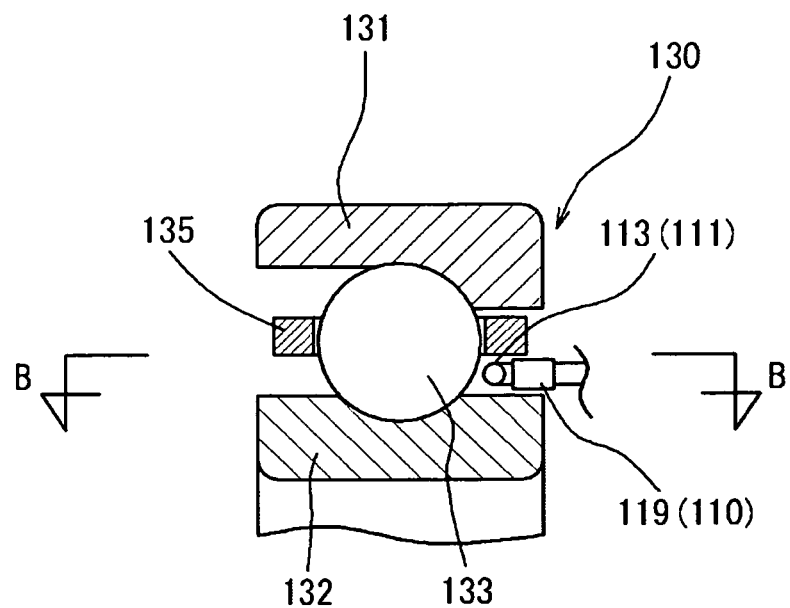
FIG. 10a is a sectional view showing a rolling bearing assembly equipped with the lubricator and lubrication monitoring device.
Figure 10B:
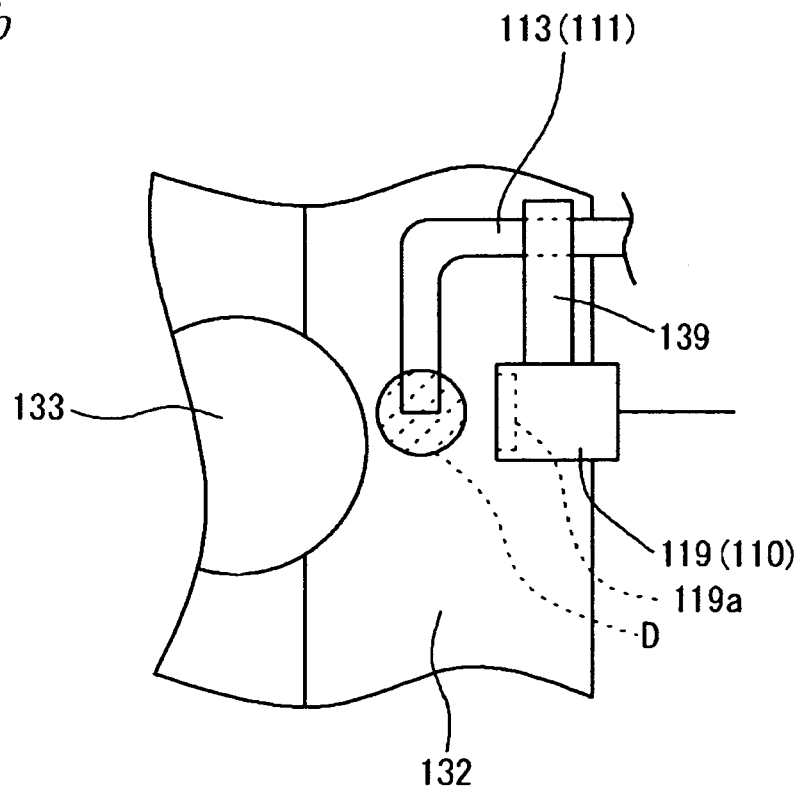

Similarly to the first embodiment, the lubricator 111 and lubrication monitoring device 110 of this embodiment may be used for lubricating the rolling bearing. FIG. 10a is a sectional view showing a rolling bearing assembly equipped with the lubricator 111 and lubrication monitoring device 110. FIG. 10b is a sectional view taken on the line B-B in FIG. 10a. The discharge nozzle 113 of the lubricator 111 is disposed in space defined between an outer ring (a first race) 131 and an inner ring (a second race) 132 of a rolling bearing 130. More specifically, a distal end of the discharge nozzle 113 is disposed in space which is defined radially outwardly of the inner ring 132 of the rolling bearing 130 and radially inwardly of a cage 135 and at which the inner ring 132 overlaps with the cage 135 in the radial direction. The discharge nozzle 113 is disposed in non-contact relation to the inner ring 132 and the cage 135. The sensor head 119 of the lubrication monitoring device 110 is disposed adjacent to the discharge nozzle 113 as spaced a predetermined distance therefrom. The sensor head 119 is fixed to place so as not to move relative to the discharge nozzle 113. Specifically, the sensor head 119 is fixed to the discharge nozzle 113 by means of a supporting member 139 formed of an insulating material. The electrode 119a of the sensor head 119 is electrically insulated from the discharge nozzle 113. The sensor head 119 and the supporting member 139 are disposed in non-contact relation to the inner ring 132 and the cage 135.

The above-described arrangement is adapted to lubricate the raceway surfaces of the inner ring 132 and the outer ring 131 and the rolling surface of a ball (a rolling element) 133 disposed therebetween with the oil droplet D outputted from the discharge nozzle 113. In the meantime, the lubricating condition can be monitored by means of the lubrication monitoring device 110. While the distal end of the discharge nozzle 113 may be oriented in the vertical direction as shown in FIG. 1, the distal end thereof may also be oriented in a horizontal direction as shown in FIG. 10 or in any other direction according to the layout of the rolling bearing 130.

Figure 11:
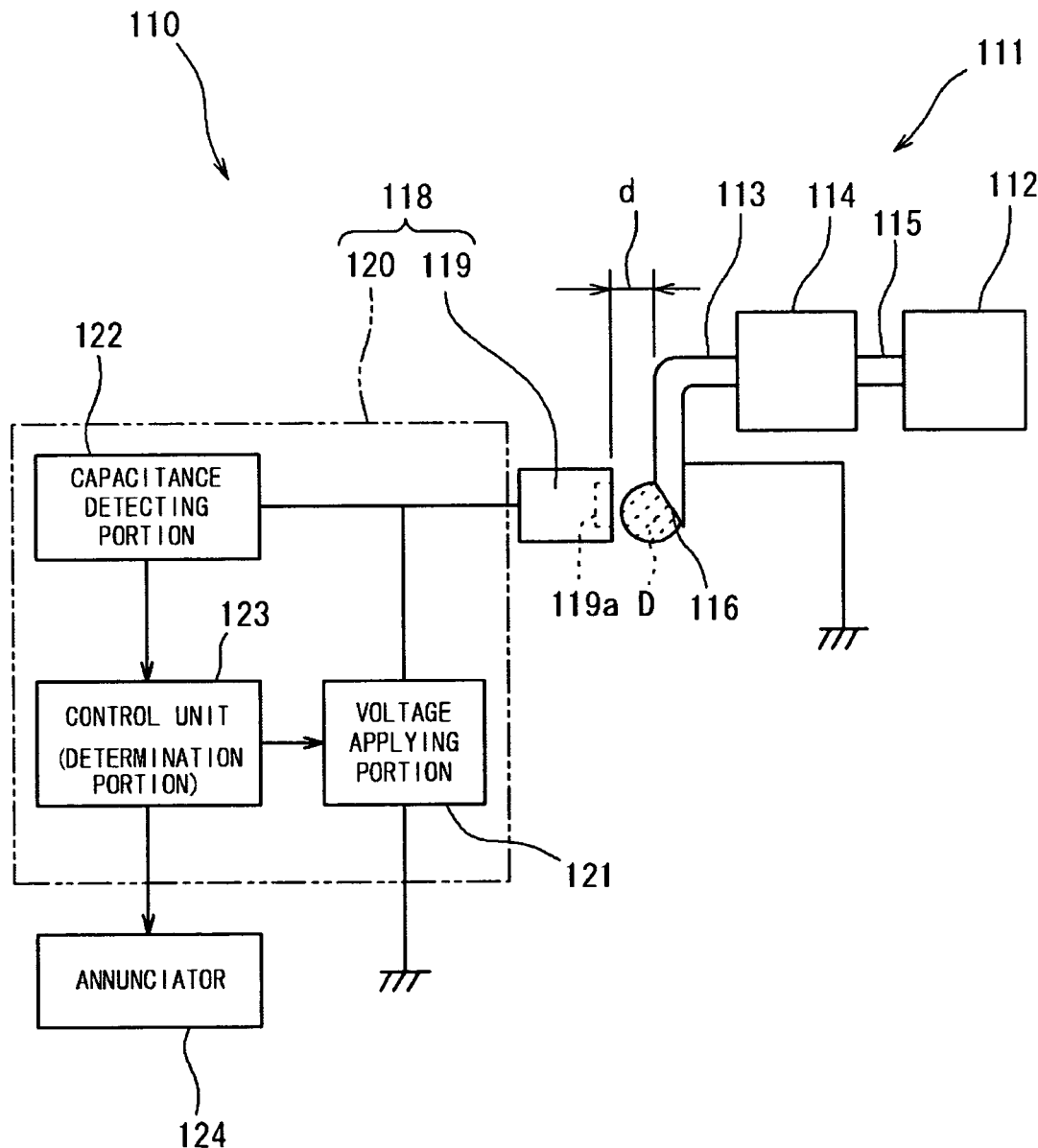
FIG. 11 is a schematic diagram showing a lubrication monitoring device and a lubricator according to a third embodiment of the invention.

FIG. 11 is a schematic diagram showing the lubrication monitoring device 110 and the lubricator 111 according to a third embodiment of the invention. The capacitance type sensor 118 of the lubrication monitoring device 110 is arranged the same way as that of the second embodiment. The lubricator 111 as a monitor object of the lubrication monitoring device 110 has the same configuration as that of the lubricator 111 of the second embodiment except for the configuration of the distal end of the discharge nozzle 113. Therefore, a detailed description on like parts is dispensed with.

The discharge nozzle 113 of the micro pump 114 has its distal end tapered so that the nozzle orifice 116 opens toward the electrode 119a of the sensor head 119.

FIG. 12a to FIG. 12d are diagrams illustrating the change in state of the oil discharged from the discharge nozzle 113 of the lubricator 111. The oil droplet D undergoes a process including the steps shown in FIG. 12a to FIG. 12d so as to be outputted from the discharge nozzle 113. The oil droplet D according to this embodiment is outputted substantially in the same manner as in the second embodiment. Hence, the output value (sensor output) of the capacitance detecting portion 22 also varies with time as shown in FIG. 9. The symbols 'a' to 'd' in FIG. 9 also correspond to the respective degrees of growth of the oil droplet D shown in FIG. 12a to FIG. 12d.

In this embodiment, however, the nozzle orifice 116 of the discharge nozzle 113 has a characteristic configuration so that a direction in which the oil droplet D bulges relative to the nozzle orifice 116 is different from that of the second embodiment.

Figure 12A:
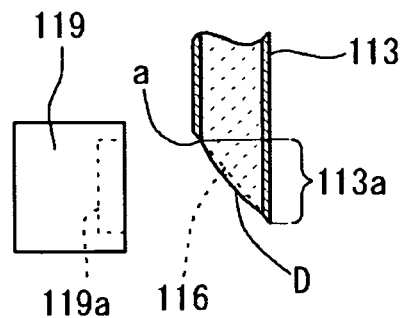
FIG. 12a to FIG. 12d are diagrams illustrating the change in state of oil discharged from a discharge nozzle of the lubricator shown in FIG. 11.

As shown in FIG. 12a, the distal end of the discharge nozzle 113 is tapered so that the nozzle orifice 116 faces the electrode 119a. A portion 113a projecting to a nozzle tip from a proximal end position 'a' of the tapered portion faces the electrode 119a across the oil droplet D. In other words, a peripheral wall portion of the discharge nozzle 113 which is opposite from the electrode 119a is projected to the nozzle tip and faces the electrode 119a. The capacitance type sensor 118 detects a capacitance between the projecting portion 113a and the electrode 119a.

Figure 12B:
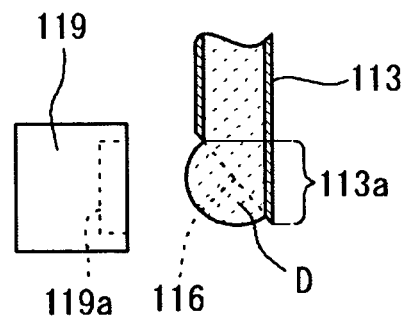
Figure 12C:
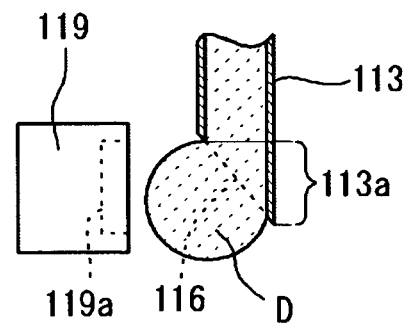
Figure 12D:
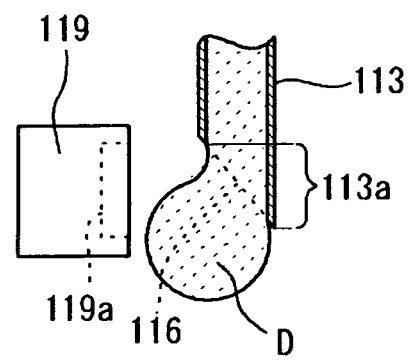

On the other hand, the oil droplet to be outputted from the nozzle orifice 116 is inhibited by the projecting portion 113a from bulging toward a side opposite from the electrode (the right-hand side as seen in the figure) but is allowed to bulge and grow toward the electrode 119a, as shown in FIG. 12b and FIG. 12c. This leads to the following advantage.

Figure 13A:
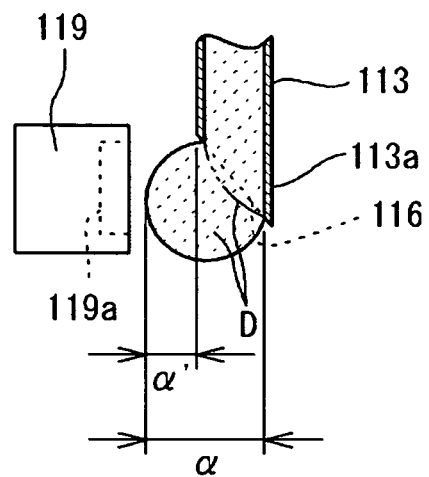
FIG. 13a to FIG. 13b are diagrams for explaining how the oil is discharged from the discharge nozzle of the lubricator by way of comparison between the second embodiment and the third embodiment.
Figure 13B:
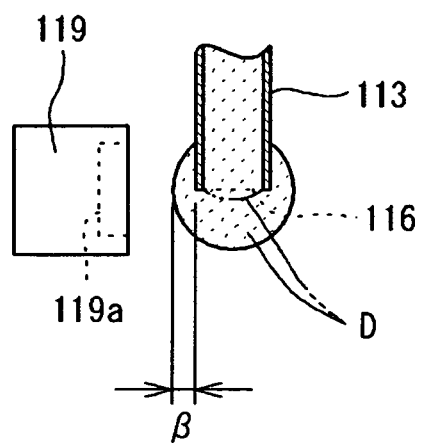

FIG. 13a and FIG. 13b are diagrams for explaining how the oil is discharged from the discharge nozzle 113 of the lubricator 111 by way of comparison between the second embodiment and the third embodiment. FIG. 13a is the same illustration as FIG. 12c showing the discharge nozzle 113 having the tapered distal end. FIG. 13b shows the second embodiment wherein the distal end of the discharge nozzle 113 is not tapered, depicting the oil droplet grown as large as that of FIG. 13a (the oil droplet just before falling). The discharge nozzle 113 of FIG. 13b faces the electrode 119a at its peripheral wall portion closest to the electrode 119a so that the capacitance between the peripheral wall portion and the electrode 119a is detected.

In the second embodiment shown in FIG. 13b, the oil droplet D bulges toward the electrode 119a by a quantity indicated by β while it grows from a substantially zero-growth state (indicated by the chain double-dashed line) to the maximum size.

In the embodiment shown in FIG. 13a, on the other hand, the oil droplet D bulges toward the electrode 119a by a quantity α, which is greater than the above quantity β, while it grows from the substantially zero-growth state (indicated by the chain double-dashed line) to the maximum size. Even in a comparison based on the peripheral wall portion of the discharge nozzle 113 which is least spaced from the electrode 119a, the oil droplet D of the embodiment bulges toward the electrode 119a by a quantity α' which is greater than the above quantity β.

According to the embodiment, the projecting portion 113a inhibits the oil droplet D from bulging to a side opposite from the electrode and hence, the oil droplet D bulges toward the electrode 119a by a greater quantity than the oil droplet D of the second embodiment which is allowed to bulge not only toward the electrode 119a but also toward the side opposite from the electrode. Thus, the capacitance variation detected by the capacitance type sensor 118 is increased so that the capacitance type sensor 118 is improved in the detection sensitivity. It is noted here that the projecting portion 113a of the discharge nozzle 113 constitutes an oil droplet receiving portion which receives the oil droplet D to be discharged from the nozzle orifice 116 thereby inhibiting the oil droplet D from bulging toward the side opposite from the electrode.

Figure 14A:
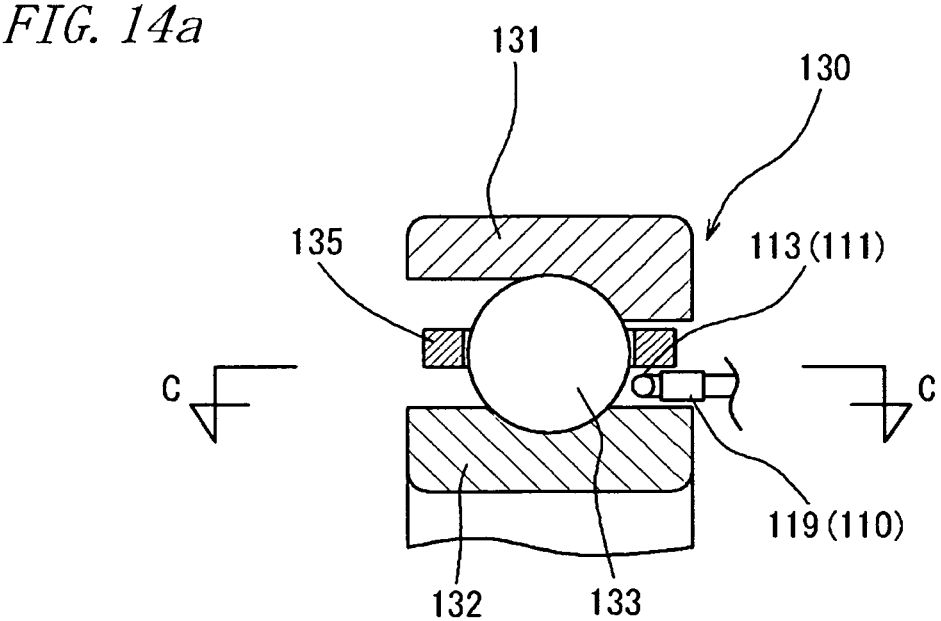
FIG. 14a is a sectional view showing a rolling bearing assembly equipped with the lubricator and lubrication monitoring device.
Figure 14B:
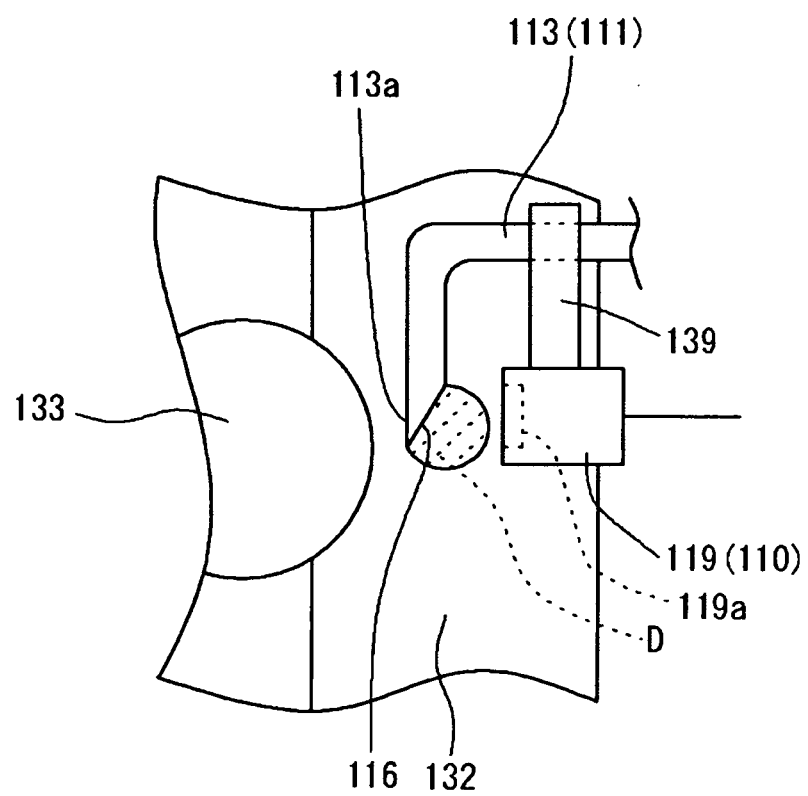

Similarly to the first and second embodiments, the lubricator 111 and the lubrication monitoring device 110 of this embodiment may also be used for lubricating a rolling bearing. FIG. 14a is a sectional view showing a rolling bearing assembly equipped with the lubricator 111 and lubrication monitoring device 110. FIG. 14b is a sectional view taken on the line C-C in FIG. 14a. The lubrication monitoring device 110 and the lubricator 111 are constructed the same way as those of the second embodiment shown in FIG. 10, except that the distal end of the discharge nozzle 113 has a different configuration. Therefore, a detailed description is dispensed with.

Figure 15A:
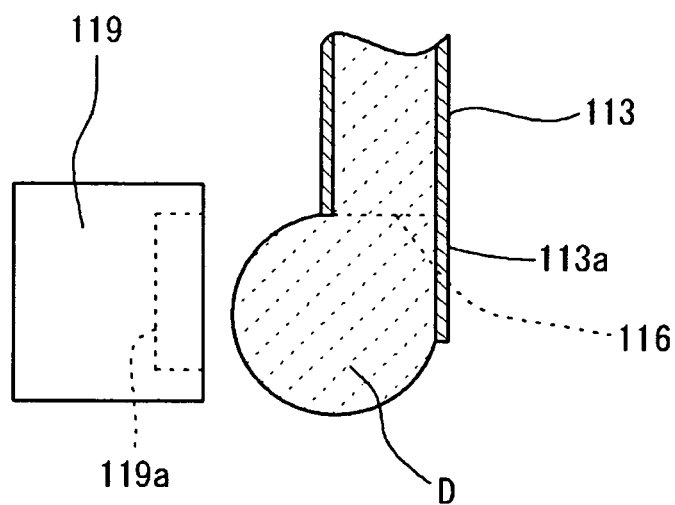
FIG. 15a to FIG. 15b are diagrams each illustrating an exemplary modification of an electrode of the lubrication monitoring device (discharge nozzle of the lubricator).
Figure 15B:
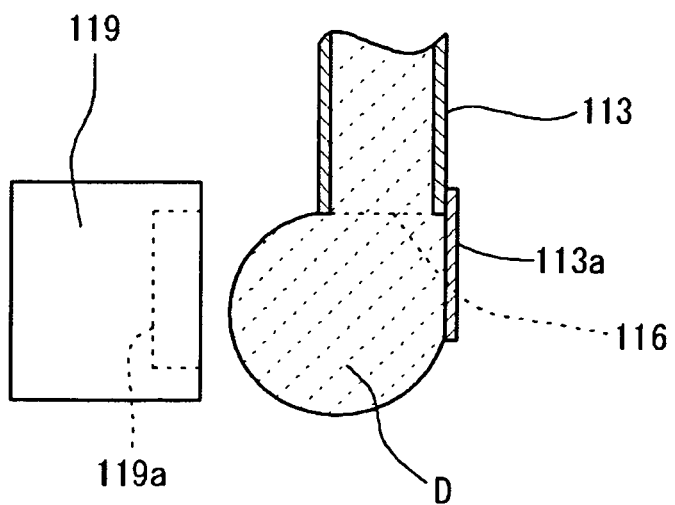

FIG. 15a and FIG. 15b are diagrams each illustrating an exemplary modification of the electrode of the lubrication monitoring device (the discharge nozzle of the lubricator). The embodiment of the invention may be modified as shown in FIG. 15a and FIG. 15b. As shown in FIG. 15a, for example, the discharge nozzle 113 is not tapered at the distal end thereof but may be formed with the projecting portion 113a (the oil droplet receiving portion) which projects from the nozzle orifice 116 to the nozzle tip. Alternatively, as shown in FIG. 15b, the projecting portion 113a (the oil droplet receiving portion) separate from the discharge nozzle 113 and formed of a conductive material may be attached to the distal end of the discharge nozzle 113. Otherwise, the discharge nozzle 113 may have the projecting portion 113a formed of the conductive material and connected to the ground potential. The other part of the discharge nozzle may be formed of an insulating material.

According to the embodiment, the capacitance type sensor 118 is designed to detect the capacitance between the electrode 119a and the projecting portion 113a of the discharge nozzle 113. However, the sensor may be designed to detect a capacitance between the electrode 119a and the peripheral wall portion of the discharge nozzle 113 which is located closest to the electrode 119a. In this case, as well, the capacitance variation can be increased because the bulging quantity α' of the oil droplet D is greater than the bulging quantity β of the oil droplet D in the second embodiment.

According to the first to third embodiments described above, the rolling bearing is not limited to the ball bearing as shown in FIG. 4a, FIG. 10a and FIG. 14a. The invention is also applicable to roller bearings. The lubrication monitoring devices 10, 110 are not exclusively used in the rolling bearing assembly. The lubrication monitoring devices may favorably be applied to all kinds of apparatuses that require lubrication or particularly to apparatuses which carry out the nanolubrication. The numerical values of the inside diameter, the outside diameter and the like of the nozzle of the above embodiments are illustrative only and may be changed as needed according to lubrication conditions or the conditions of the lubrication point.

In the second and third embodiments, the distance between the discharge nozzle 113 and the sensor head 119 or the like may also be changed as needed according to the lubrication conditions or the conditions of the lubrication point. In the rolling bearing under high speed operation, for example, the rotation of rotational rings produces wind pressure so that the oil droplet D halfway through the growth may be blown away from the nozzle orifice 116. In this case, therefore, the distance of the sensor head 119 form the discharge nozzle 113 may be reduced to a degree that the oil droplet D does not adhere to the sensor head 119. It is thus ensured that the variation of capacitance between the discharge nozzle 113 and the sensor head 119 in conjunction with the growth of the oil droplet D can be detected. If the oil droplet D adheres to the sensor head 119, there is practically no problem because the oil droplet D can be blown away from the discharge nozzle 113 by the wind pressure caused by the rotating rings.

In the second and third embodiments, the sensor head 119 may be fixed to any place so long as the sensor head is not moved relative to the discharge nozzle 113 and is electrically insulated. Accordingly, the sensor head 119 may also be fixed to the micro pump 114 or the tank 112 or otherwise to a race member or spacer to which the micro pump or tank is fixed.

What is claimed is:

1. A lubrication monitoring device for monitoring a lubricating condition of a lubricator feeding an oil droplet at a predetermined time interval by a discharge nozzle comprising a nozzle orifice, the lubrication monitoring device comprising:
   a pair of electrodes disposed in a proximity of the nozzle orifice;
   a capacitance detecting portion for detecting a variation of a capacitance between the pair of electrodes, the capacitance varying in conjunction with a varying amount of oil discharged from the nozzle orifice in a space between the pair of electrodes; and
   a determination portion for determining whether the oil droplet is fed at the predetermined time interval, the determination being made based on a detection result supplied from the capacitance detecting portion,
   wherein the nozzle orifice comprises an inclined portion that faces an electrode of the pair of electrodes.

2. A lubrication monitoring device according to claim 1, wherein the pair of electrodes face each other across the nozzle orifice and temporarily retain the oil discharged from the nozzle orifice.

3. A lubrication monitoring device according to claim 1, wherein one of the pair of electrodes comprises the discharge nozzle,
   wherein the electrode of the pair of electrodes is disposed at a predetermined distance from the nozzle orifice of the discharge nozzle, and
   wherein the capacitance detecting portion detects the variation of capacitance between the discharge nozzle and the electrode of the pair of electrodes, the capacitance varying in conjunction with a growth of the oil droplet around the nozzle orifice.

4. A lubrication monitoring device according to claim 1, wherein one of the pair of electrodes comprises the discharge nozzle,
   wherein the electrode of the pair of electrodes is disposed at a place lateral to the discharge nozzle and adjacent to the nozzle orifice and spaced a predetermined distance therefrom,
   wherein an oil droplet receiving portion facing the electrode of the pair of electrodes across the oil droplet is provided on a circumference of the nozzle orifice in order to inhibit the oil droplet discharged from the nozzle orifice from bulging to a side opposite from the electrode of the pair of electrodes, and
   wherein the capacitance detecting portion detects the variation of capacitance between the discharge nozzle and the electrode of the pair of electrodes, the capacitance varying in conjunction with a growth of the oil droplet around the nozzle orifice.

5. A lubrication monitoring device according to claim 1, wherein the nozzle orifice opens toward the electrode of the pair of electrodes located outside the discharge nozzle.

6. A lubrication monitoring device according to claim 1, wherein a projecting portion of a nozzle tip that extends from a proximal end position of the inclined portion, across the oil droplet, faces the electrode of the pair of electrodes located outside the discharge nozzle.

7. A lubrication monitoring device according to claim 6, wherein a peripheral wall portion of the discharge nozzle, which is opposite from the electrode of the pair of electrodes, is projected to the nozzle tip and faces the electrode of the pair of electrodes.

8. A lubrication monitoring device according to claim 7, wherein the projecting portion inhibits the oil droplet outputted from the nozzle orifice from bulging toward a side opposite from the electrode of the pair of electrodes, the oil droplet outputted from the nozzle orifice bulging and growing toward the electrode of the pair of electrodes.

9. A lubrication monitoring method for monitoring a lubricating condition of a lubricator feeding an oil droplet at a predetermined time interval by a discharge nozzle comprising a nozzle orifice,
  wherein a pair of electrodes are disposed in a proximity of the nozzle orifice,
  wherein the lubrication monitoring method includes:
    detecting a variation of a capacitance between the pair of electrodes, the capacitance varying in conjunction with a varying amount of oil discharged from the nozzle orifice in a space between the pair of electrodes; and
    determining whether the oil droplet is fed at the predetermined time interval based on the detection result,
  wherein the nozzle orifice comprises an inclined portion that faces an electrode of the pair of electrodes.

10. A lubrication monitoring method according to claim 9, wherein the pair of electrodes face each other across the nozzle orifice and temporarily retain the oil discharged from the nozzle orifice.

11. A lubrication monitoring method according to claim 9, wherein one of the pair of electrodes comprises the discharge nozzle,
  wherein the electrode of the pair of electrodes is disposed at a predetermined distance from the nozzle orifice of the discharge nozzle, and
  wherein the detecting is to detect the variation of capacitance between the discharge nozzle and the electrode of the pair of electrodes, the capacitance varying in conjunction with a growth of the oil droplet around the nozzle orifice.

12. A lubrication monitoring method according to claim 9, wherein one of the pair of electrodes comprises the discharge nozzle,
  wherein the electrode of the pair of electrodes is disposed at a place lateral to the discharge nozzle and spaced a predetermined distance from the nozzle orifice,
  wherein an oil droplet receiving portion facing the electrode of the pair of electrodes across the oil droplet is provided on a circumference of the nozzle orifice in order to inhibit the oil droplet discharged from the nozzle orifice from bulging to a side opposite from the electrode of the pair of electrodes, and
  wherein the detecting is to detect the variation of capacitance between the discharge nozzle and the electrode of the pair of electrodes, the capacitance varying in conjunction with a growth of the oil droplet around the nozzle orifice.

\* \* \* \* \*